(12) United States Patent
Klemen

(10) Patent No.: US 11,453,488 B2
(45) Date of Patent: Sep. 27, 2022

(54) LIGHTWEIGHT PARALLEL COMBUSTION LIFT SYSTEM FOR VERTICAL TAKEOFF AIRCRAFT

(71) Applicant: Rolls-Royce Corporation, Indianapolis, IN (US)

(72) Inventor: Donald Klemen, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 443 days.

(21) Appl. No.: 16/588,695

(22) Filed: Sep. 30, 2019

(65) Prior Publication Data

US 2021/0094685 A1    Apr. 1, 2021

(51) Int. Cl.

| | | |
|---|---|---|
| *B64C 29/00* | (2006.01) | |
| *B64D 27/10* | (2006.01) | |
| *B64D 27/16* | (2006.01) | |
| *B64D 33/04* | (2006.01) | |
| *B64D 27/24* | (2006.01) | |
| *B60L 50/10* | (2019.01) | |
| *B64D 27/02* | (2006.01) | |
| *F02C 3/04* | (2006.01) | |
| *F02C 7/22* | (2006.01) | |
| *H02K 7/18* | (2006.01) | |

(52) U.S. Cl.
CPC .......... *B64C 29/0016* (2013.01); *B60L 50/10* (2019.02); *B64D 27/02* (2013.01); *B64D 27/10* (2013.01); *B64D 27/16* (2013.01); *B64D 27/24* (2013.01); *B64D 33/04* (2013.01); *F02C 3/04* (2013.01); *F02C 7/22* (2013.01); *H02K 7/1823* (2013.01); *B60L 2200/10* (2013.01); *B64D 2027/026* (2013.01)

(58) Field of Classification Search
CPC . B64C 29/0025; B64C 29/0016; B64C 15/14; B64D 27/02; B64D 27/10; B64D 27/24; B64D 33/04; B64D 2027/026; B60L 50/10; H02K 7/1823
USPC ....................................................... 244/23 B
See application file for complete search history.

(56) References Cited

U.S. PATENT DOCUMENTS

| | | | | |
|---|---|---|---|---|
| 2,939,649 | A * | 6/1960 | Shaw .................. | B64C 29/0025 244/12.3 |
| 3,013,744 | A * | 12/1961 | Klapproth ........... | B64C 29/0025 244/12.3 |
| 3,273,339 | A * | 9/1966 | Borysthen-Tkacz ........................ B64C 29/0025 239/265.29 |
| 3,783,618 | A * | 1/1974 | Kawamura ............. | F02K 3/068 244/23 B |
| 3,867,813 | A * | 2/1975 | Leibach .................. | F02K 3/077 60/225 |
| 5,275,356 | A * | 1/1994 | Bollinger .................. | F02K 3/08 244/12.3 |
| 6,270,037 | B1 | 8/2001 | Freese | |
| 7,762,085 | B2 | 7/2010 | Exley | |

(Continued)

*Primary Examiner* — Jason H Duger
(74) *Attorney, Agent, or Firm* — Shumaker & Sieffert, P.A.

(57) ABSTRACT

A lightweight lift system for VTOL/VSTOL operation running in parallel with an existing turbine. This system distributes LP power by switching compressor flow and fuel proportionally over to the lift turbine module. As forward thrust is demanded, some of the power is transitioned back to the flight LP turbine, which can drive a variable propeller, fan or can supply jet thrust. As flight motion occurs, the power to the lift fan can be reduced to zero and lift closed off.

16 Claims, 5 Drawing Sheets

(56) References Cited

U.S. PATENT DOCUMENTS

| | | | |
|---|---|---|---|
| 8,382,030 B2* | 2/2013 | Kosheleff | B64C 29/0025 244/23 B |
| 2019/0193864 A1 | 6/2019 | Evulet | |
| 2020/0156801 A1* | 5/2020 | Tamada | B64C 27/14 |

* cited by examiner

LIGHTWEIGHT PARALLEL COMBUSTION LIFT SYSTEM FOR VERTICAL TAKEOFF AIRCRAFT

BACKGROUND

This disclosure relates to a lightweight alternative to electric lift hybrid systems and mechanical linked systems used in vertical take-off and landing (VTOL) or very short take-off and landing (VSTOL) aircraft.

FIG. 1 illustrates both a prior art electric hybrid drive system as well as a prior art mechanical drive system in an aircraft 100. A gas turbine engine 110 powers the aircraft 100. The gas turbine 110 includes a compressor 112 (the compressor may include both a high pressure and low pressure compressor), a combustion chamber 114 as well as a turbine (the turbine may include both a high pressure and low pressure turbine as known in the art.) The turbine 110 operates using the basic turbine Rankine cycle (compression, isobaric heating, and expansion).

The electrical hybrid system, shown in FIG. 1, for driving the lift fan 150 includes a generator 172, distribution system 174 and a motor 170. The electric systems required, in the illustrated hybrid system, unfortunately results in significant weight from motors, inverters and battery systems. These systems are only employed during VTOL/VSTOL operations and thus aircraft performance in other flight regimes are encumbered by their presence. The power is distributed electrically; however, all the power ultimately comes from the gas turbine 110 driving the generator 172 via the turbine 116.

A mechanical system for driving the lift fan 150 includes a power take off shaft (PTO) 162, and a transmission system 160 is also represented in FIG. 1. The transmission system 160 typically includes a clutch (not shown) as well as a gear system (not shown) to transfer the shaft power to the lift fan 150 at an RPM lower than the typical speed of the spool 118 driving the PTO 162. In lift mode, power is extracted from the engine's turbine 116 (typically the low-pressure turbine) via the drive shaft 162, clutch, and gearbox 160 which is used to drive the Lift Fan 150. The exhaust is discharged through a thrust vectoring nozzle 154 on the underside of the aircraft to provide balanced lift. Bleed air ducted to outboard roll nozzles provides roll control during VTOL/VSTOL. These mechanical linkages also result in significant weight penalties as well as introduce a degree of control complexity as the gas turbine 110 directly drives the lift fan 150 as well as the exhaust for thrust vectoring.

Additionally, concerns on past lift systems using directed turbine thrust, such as Harrier Jet, is the temperature issue. Landing of VTOL/VSTOL aircraft result in flow impingement of jet exhaust on to the ground. In particular, aircraft during hover produce high-temperature impinging jets on the landing surface. These lift producing jets have a high temperature, turbulent and highly oscillatory flow fields, which leads to severe ground erosion of the landing surface and deleterious hot gas ingestion into the engine inlets.

Thus, there is a need in the art for a lightweight controllable system, specifically a system for driving the lift fan(s) in a controllable fashion without the incumbent weight and complexities of hybrid electric and mechanical systems and without the ground impingement issues of prior art directed exhaust lift systems.

SUMMARY

According to some aspects of the present disclosure, a distributed combustor gas turbine system includes a compressor and a first combustor associated with a first turbine and, the first turbine in fluid communication with and downstream from the compressor and first combustor via a first passage. The first turbine drives the compressor and a first power output. The system also includes a power turbine with a second combustor and a second turbine. In the system, the power turbine is separated from the first turbine and the first combustor, while being in fluid communication with the compressor via a second passage. A second power output is coupled to a second load, the second turbine drives the second power output. The first power output and the second power output in the system are controlled independent of each other.

In another aspect, a VTOL aircraft propulsion and lift system is presented. The system including a propulsion gas turbine, the propulsion gas turbine with a compressor; a primary combustor and a primary turbine. The first turbine in fluid communication with and downstream from the compressor and first combustor via a first passage. The first turbine drives the compressor and a propulor. The system also includes a lift fan power turbine including a secondary combustor, a secondary turbine, and a lift fan driven by the secondary turbine. The lift fan power turbine located remotely from the primary turbine and the primary combustor, the lift fan power turbine is in fluid communication with the compressor via a second passage. The propulsor and the lift fan in the system are not mechanically coupled; and the force generated by the lift fan is anti-parallel to the thrust generated by the propulsor during forward flight.

Another aspect of the disclosed subject matter includes a method for localized power extraction from a working fluid. The method includes compressing a working fluid at a primary compressor; dividing out from the compressed working fluid an auxiliary stream downstream of the primary compressor; injecting fuel into the compressed working fluid in a primary combustor and heating the working fluid via combustion of the fuel. The method further includes expanding the heated working fluid through a primary turbine and driving the primary compressor from work extracted from the expanded working fluid; routing the auxiliary stream to an auxiliary combustion chamber remote from the core stream; injecting fuel into the auxiliary stream in the auxiliary combustion chamber and heating the auxiliary stream via combustion of the injected fuel; and expanding the heated auxiliary stream through an auxiliary turbine and driving a lift fan from work extracted from the expanded auxiliary stream.

BRIEF DESCRIPTION OF THE DRAWINGS

The following will be apparent from elements of the figures, which are provided for illustrative purposes.

Figure 1:
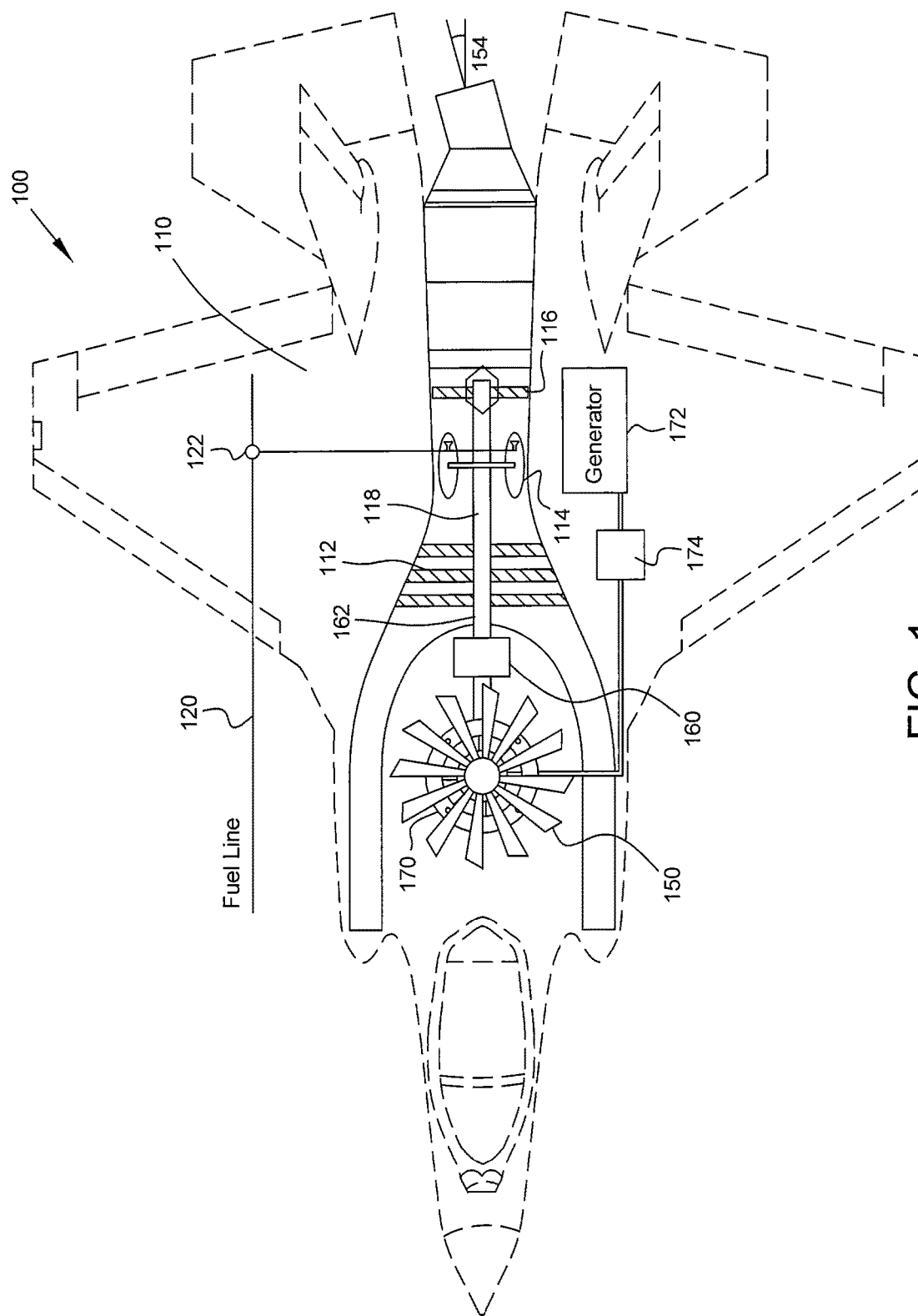
FIG. 1 is an illustration of prior art approaches to driving lift fans in VTOL and VSTOL aircraft.

The present application discloses illustrative (i.e., example) embodiments. The claimed inventions are not limited to the illustrative embodiments. Therefore, many implementations of the claims will be different from the illustrative embodiments. Various modifications may be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

The disclosed subject matter provides a lightweight alternative to electric lift hybrid systems and mechanical system with the integration of an additional remote power turbine to drive a lift fan or multiple lift fan modules. By distribution of compressor flow and fuel to a remote power lift turbine, the output power generated by the system can be used for vertical lift then transitioned back to forward propulsion.

The remote power turbine is found to require approximately ⅓ of the compressor flow and fuel to achieve full power lift, the remainder of the flow powers the directed exhaust, forward propulsion and the compressor. In a typical take-off scenario, a portion of the compressor flow and fuel flow would be directed to the lift fan (preferably but not limited to fixed pitch), and then transition fuel power and compressor flow back to propulsion (propeller, fan or jet), while reducing power to lift system. After the lift is complete, the lift fan may be shut off and flight continues efficiently generating the required lift from the wings. During lift and the transition to wings, smaller electric fans may be used to balance the aircraft and rotate direction as commanded by the pilot while the control surfaces are ineffective.

Figure 2:
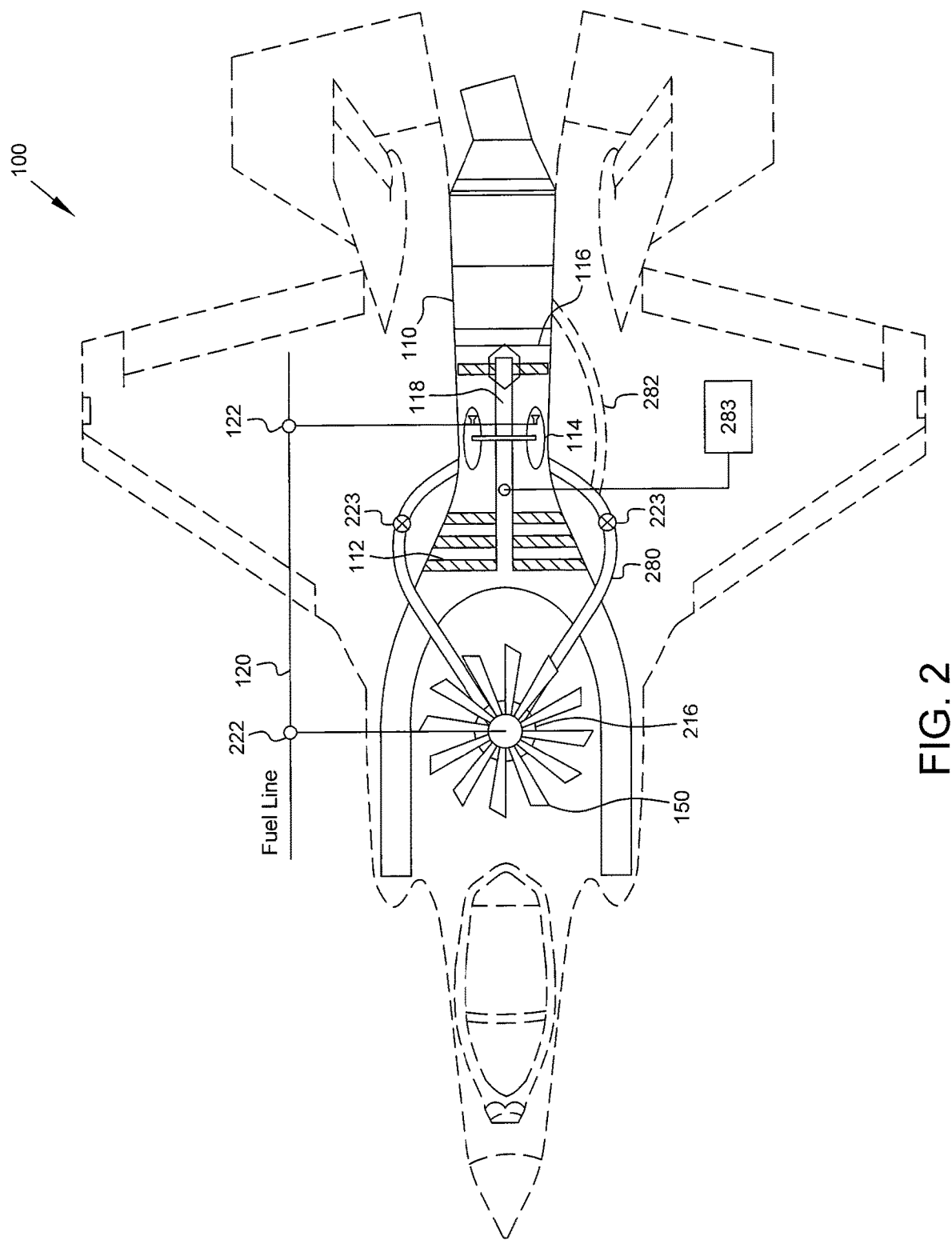
FIG. 2 is an illustration of an embodiment of the disclosed subject matter for driving a lift fan in a VTOL or VSTOL aircraft.

FIG. 2 is an illustration of the aircraft 100 of FIG. 1 with the remote power turbine driving the lift fan 150, rather than the discussed prior art electrical and mechanical systems. The aircraft 100 includes the gas turbine 110 of FIG. 1 including the primary compressor 112, primary combustion chamber(s) 114 and primary turbine 116. The working fluid flows from the primary compressor 112 to the combustion chamber(s) 114 and then expanded through the primary turbine(s) 116. The primary turbine 116 drives the compressor and/or the propulsor (prop, fan or jet). The aircraft 100 of FIG. 2 also includes a remote module 216 including a remote combustion chamber 314 (FIG. 3) and remote turbine 316 (FIG. 3) for driving the lift fan 150. As shown in FIG. 2, the lift fan 150 is ducted; alternatively, the lift fan may be shrouded and rotatable about one or more axis, as may be desired for aircraft attitude control or propulsion.

As shown in FIG. 2, the passages 280 bleed up to a third of the compressed flow from compressor 112 into the remote module 216; fuel supplied via fuel line 120 and thru controller 222 is burned within the remote combustion chamber(s) 314 and the subsequent exhaust is expanded through the remote power turbine 314 in order to drive the lift fan 150. The passages 280 are preferably thermally insulated to avoid loss and regulated (via valve(s) 223) to control the amount of bleed from the primary compressor 112. Bothe the fuel and bleed valves 222 and 223 respectively may be controlled by controller 450 (shown in FIG. 4). The passages 280 may also be isolated from the core stream passage (i.e. the path through the primary combustor to the primary turbine 116) downstream of the primary compressor 112. Alternatively, post turbine bleed passages 282 may bleed partially expanded exhaust gases downstream of the primary turbine to the remote turbine module 216 for further combustion and expansion (similar to an afterburner). The partially expanded exhaust gases while having a higher temperature than the pre combustor bleeds advantageously have a lower temperature than the turbine inlet temperature.

The provisioning of compressed flow and fuel serves to control the output power of the lift fan 150, and thus the remote turbine module may be controlled quasi-independently from the parallel turbine 110, only relying upon the turbine's bleed supply.

Figure 3:
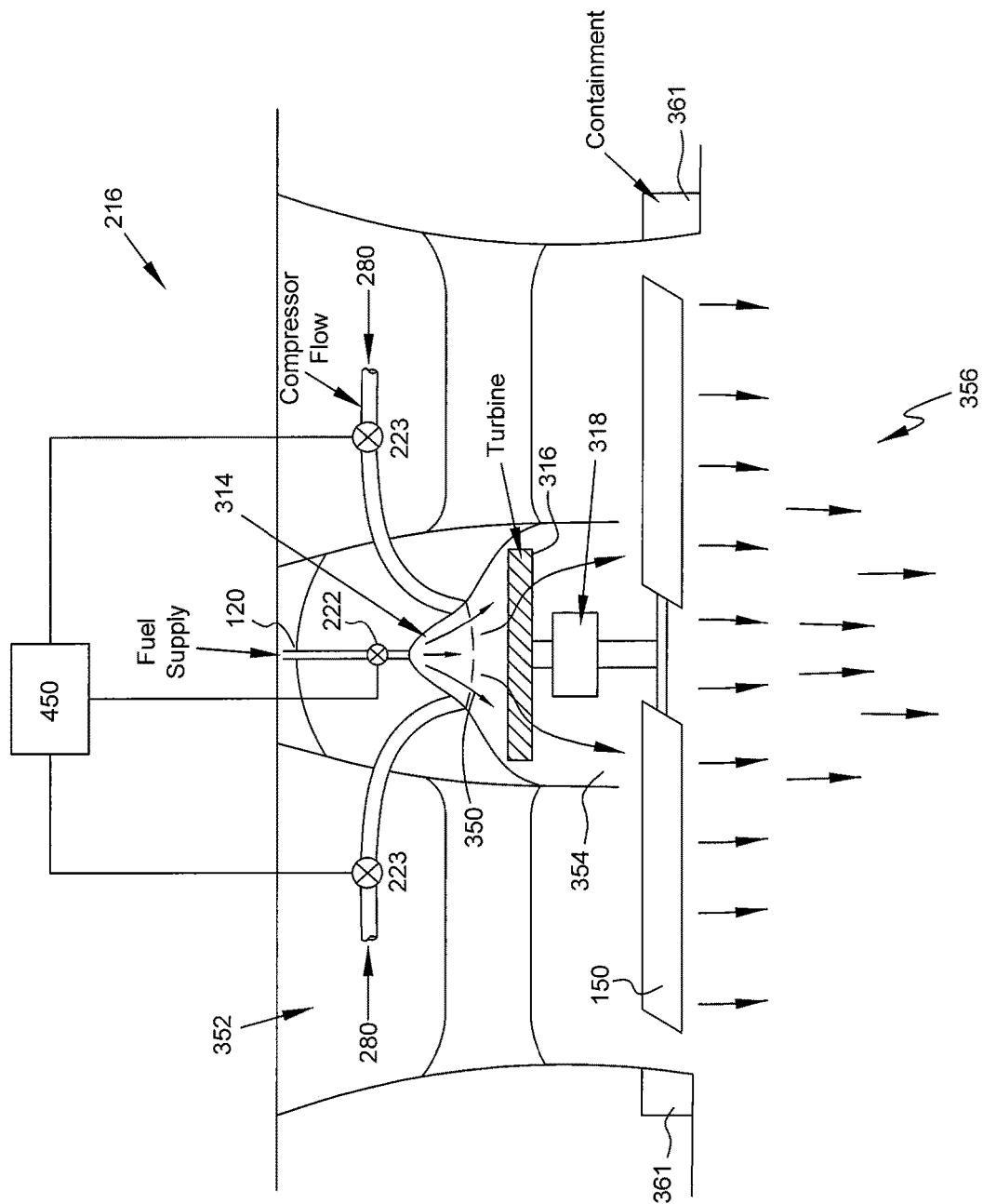
FIG. 3 is an illustration of the driving module according to embodiments of the disclosed subject matter.

FIG. 3 illustrates the remote turbine module 216 of FIG. 2. The compressed flow supplied by the passages 280 and fuel 120 from the controller 222 is combusted in the remote combustion chamber 314. This provides additional lift work due to the combustion expansion process. Although a central combustion chamber is shown in FIG. 3, multiple combustors are also envisioned and may be arranged circumferentially around the turbine axis. The exhaust 350 from the remote combustion chamber 314 is expanded through the turbine 316 that drives the lift fan 150 via a gearbox 318. The gearbox 318 may include a gear reduction system, such as a lay, planetary or star arrangement to achieve the desired rotational speed of the lift fan 150. In addition, gearbox 318 may include a motor/generator to provide improved transient response or to supply balance fans during lift operation.

The exhaust 354 from the remote turbine 316 acts as an ejector pump supplementing the fan 150 in drawing in fan intake air 352. The exhaust 354 is further mixed with the fan intake air via passages through the lift fan 150. In addition to cooling the hot exhaust 354, the mixing reduces the velocity and temperature of the exhaust 354 thus mitigating the surface impingement issues previously discussed. The resultant lift fan exhaust 356 has peak temperatures and velocities much lower than the exhaust 354. The remote turbine module 216 may further include fan blade containment system 361 as known in the art. The entrainment of the fan intake air 352 further enhances the lift generated by the lift fan 150. In FIG. 3, while the remote turbine 316 is shown concentric and upstream of the lift fan 150, such an arrangement is not required, though advantageous. The remote turbine 316 may be offset from the lift fans center axis, or may be downstream; furthermore, the remote turbine 316 may drive multiple lift fans upstream and downstream of the remote turbine 316.

By design, the module 216 allows the manufacturer of turbine engines the ability to supply a module to airframe designers that meets the best aerospace standards. The module 216 may be connected to the airframe 100 on flexible mounts to provide vibration isolation.

Figure 4:
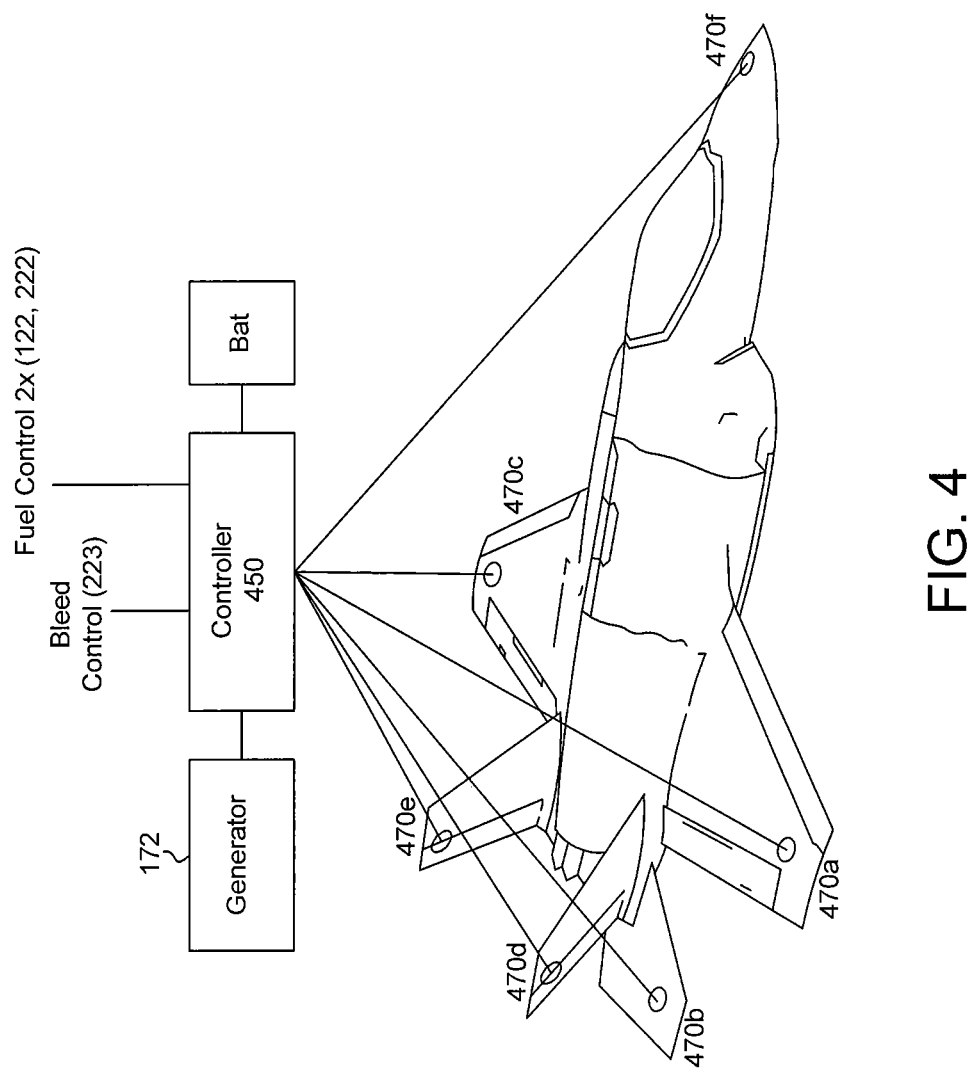
FIG. 4 is an illustration of an attitude control system for an aircraft employing an embodiment of the disclosed subject matter.

FIG. 4 illustrates an electrical attitude control systems for the aircraft 100 employing the remote lift fan module 216. To balance the aircraft rather than using bleed air from the compressor, or additional remote modules 216 (of significantly smaller size), electric fan motors 470a-f may be integrated into the wings and tail of the aircraft 100. These electric fan motors 470a-f used in combination provide roll, yaw and pitch control of the aircraft 100. Although six electric balancing motors are shown in FIG. 4, various amounts and sizes of balancing motors 470 are envisioned depending on the aircrafts architecture and the controllability of the primary lift generators (e.g. lift fan and directed exhaust). Because of the reduced loads resulting from these balancing motor, the distribution architecture, including an inverter, generator, distribution, battery etc., is also significantly reduced. The use of electric motors also significantly increased control and responsiveness over bleed air, or remote turbines.

The controller 450 of the remote module 216, which controls the fuel via valve 222 and the bleed supply 280 during VTOL/VSTOL operations, may additionally control the balancing motors 470*a-f* during the same operations as shown in FIG. 4.

Figure 5:
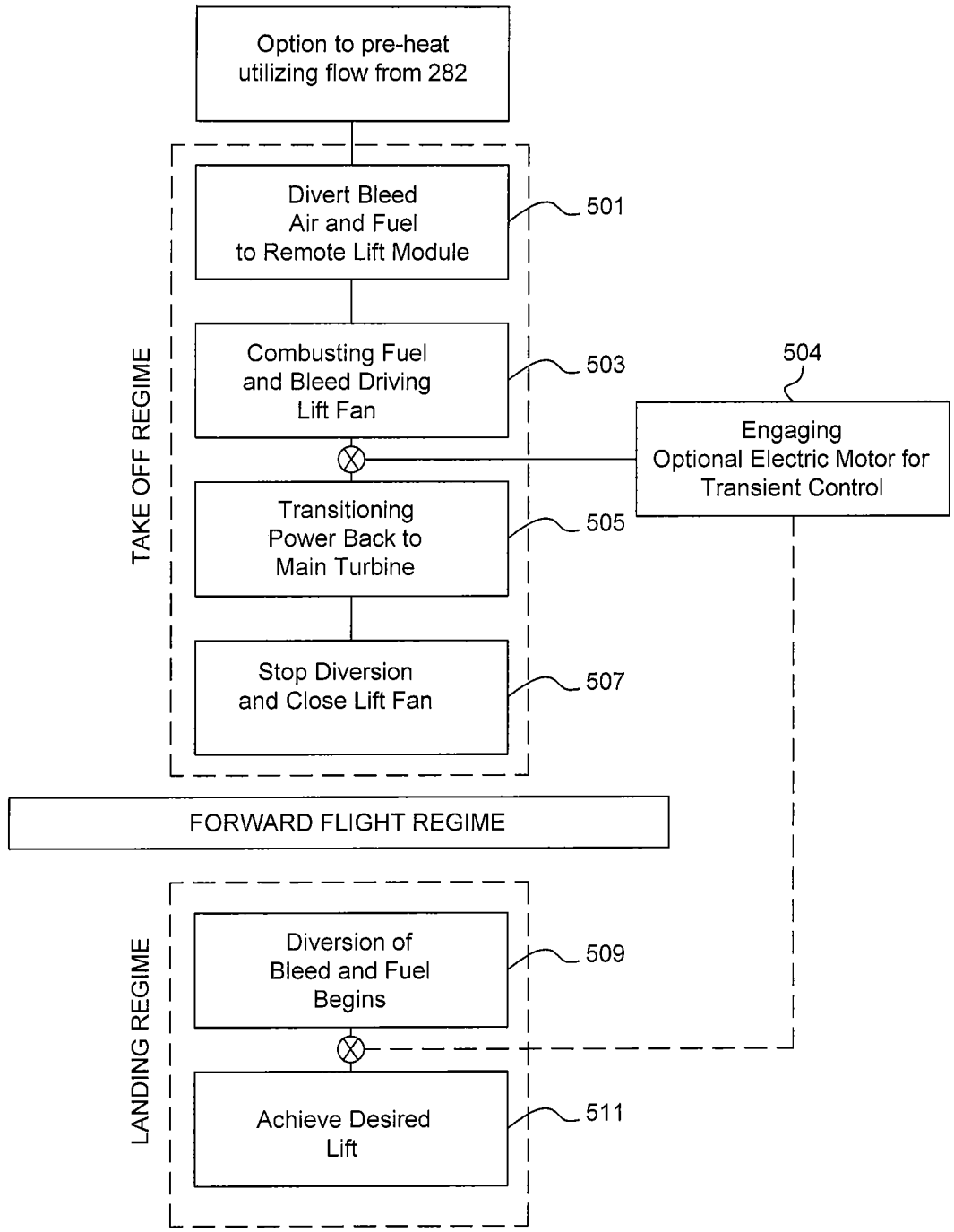
FIG. 5 is a flow chart of a method of transitioning the aircraft described in FIG. 2 between vertical and horizontal flight.

FIG. 5 illustrates the use of a remote turbine provides a lightweight lift system running in parallel with an existing turbine. By distributing low pressure flow from the compressor and fuel proportionally to the lift turbine module 216, the lift fan 150 is powered without the electrical and mechanical system overhead as described above. An electric module could be added to the system for additional lift boost or power supply to balance. This may allow sizing of a smaller primary flight engine. As the control of the fuel generally may be accomplished in a more responsive fashion than the control of the bleed air, the relative proportions between the bleed air and fuel flow need not be maintained, in particular where regulation of the fuel is used to regulate the output of the lift fan 150 (e.g. maintaining bleed flow and varying fuel flow to the lift fan 150.)

In VTOL/VSTOL take off operations, bleed air and fuel are diverted from the propulsion turbine 116 via passages 280 and valve 222 respectively to the remote lift module 216 as shown in Block 501. The fuel is combusted and expanded through remote turbine 316 driving the lift fan 150 as shown in Block 503. Optionally, control of electric attitude motors may also be engaged during transition as shown in Block 504 (the attitude control motors may also be used during the landing regime). During transition to forward flight, as forward thrust is demanded, the diversion of bleed air and fuel is transitioned back to the primary turbine 116 (typically the low pressure turbine), which drives a variable propeller, fan or supplies jet thrust for forward propulsion as shown in Block 505. As forward velocity increases beyond the critical velocity, (i.e. the velocity in which the wings provide the required lift), the diversion of compressed flow and fuel is stopped and the lift fan 150 may be closed off to enhance the aerodynamics of the aircraft in forward flight, as shown in Block 507.

During landing operations, the order is reversed. The lift fan 150 is opened and diversion of bleed and fuel begins to the lift fan module as shown in Block 509. The diversion increases until the required lift of the lift fan 150 is met and the aircraft lands as shown in block 511.

An additional aspect of the disclosed subject matter allows independent design of the remote turbine. Specifically, using compressor and fuel distribution eliminates the requirement of mechanical integration (other than ducting), thereby allowing new product modules to be designed independent of the airframe, thus decreasing production timelines.

A further aspect of the disclosed subject matter enables driving a smaller generator, which allows powering smaller fans integrated into the aircraft for balance of the aircraft during lift, without the added weight penalty associated with true hybrid systems. Alternatively, multiple fueled units (remote turbines) could be used; however, response time and simplification may favor the use of electrically driven balance control systems.

Still another aspect of the disclosed subject matter is the reduction of ground impinging problems that are typically associated with directed exhaust systems. By mixing of the remote turbine exhaust with entrained lift air, where the turbine exhaust acts as an ejector pump, and further passing the exhaust through the lift fan 150 itself, a sufficient dilution of the exhaust occurs to reduce exhaust temperatures and velocity.

Yet another aspect of the disclosed subject matter is the geometric separation of the primary turbine and the remote lift module. Because only the compressed flow is shared, shafts, rotation, and control of the remote lift module 216 need not be dependent on the shaft, rotation and control of the primary turbine 116. Thus shaft orientation, rotational speed, rotational direction, and control of the module 216 may take on various relationships with the primary turbine. For example, the rotations of the remote turbine 316 and the primary turbine 116 may be opposite each other, the rotation may not be co-axial; the change in power extracted from the remote turbine 316 may not require a proportional increase or decrease in power from the primary turbine 116, etc.

Although examples are illustrated and described herein, embodiments are nevertheless not limited to the details shown, since various modifications and structural changes may be made therein by those of ordinary skill within the scope and range of equivalents of the claims.

What I claim is:

1. A distributed combustor gas turbine system, comprising:
    a gas turbine, comprising:
        a compressor;
        a first combustor and,
        a first turbine, the first turbine in fluid communication with and downstream from the compressor and first combustor via a first passage; wherein the first turbine drives the compressor and a first power output;
    a power turbine comprising
        a second combustor,
        a second turbine,
        the power turbine remote from the first turbine and the first combustor, the power turbine being in fluid communication with the compressor via a second passage;
    a second power output coupled to a second load, the second turbine drives the second power output, wherein the first power output and the second power output are independent of each other, and wherein an exhaust outlet of the second turbine is located within a duct containing a lift fan upstream of the lift fan and configured such that an exhaust flow exiting the exhaust outlet acts as an ejector pump to supplement drawing air into an intake of the lift fan.

2. The system of claim 1, wherein the first and second passages being isolated downstream from the compressor.

3. The system of claim 1, wherein the first power output is connected to a propulsion fan and the second power output is connected to the lift fan.

4. The system of claim 1, further comprising a valve in the second passage, said valve controlling flow from the compressor into the second passage.

5. The system of claim 1, wherein the second combustor is in fluid communication with the first turbine, compressor and second turbine via the second passage; wherein the first passage forms an upstream portion of the second passage.

6. The system of claim 1, wherein the second combustor is upstream of the second turbine and in fluid communication with the compressor and second turbine via the second passage; wherein the first passage and second passage are parallel.

7. The system of claim 1, wherein the first and second turbines are not co-axial.

8. The system of claim 5, wherein the first and second turbines are not co-axial.

9. A VTOL aircraft propulsion and lift system comprising:
a propulsion gas turbine, the propulsion gas turbine comprising:
  a compressor;
  a primary combustor and,
  a primary turbine, the primary turbine in fluid communication with and downstream from the compressor and primary combustor via a first passage; wherein the primary turbine drives the compressor and a propulsor;
a lift fan power turbine, the lift fan power turbine comprising
  a secondary combustor,
  a secondary turbine, and
  a lift fan driven by the secondary turbine;
  the lift fan power turbine being located remotely from the primary turbine and the primary combustor, the lift fan power turbine being in fluid communication with the compressor via a second passage;
wherein the propulsor and the lift fan are not mechanically coupled;
wherein a force generated by the lift fan is not parallel to a thrust generated by the propulsor; and
wherein an exhaust outlet of the secondary turbine is located within a duct containing the lift fan upstream of the lift fan and configured such that an exhaust flow exiting the exhaust outlet acts as an ejector pump to supplement drawing air into an intake of the lift fan.

10. The system of claim 9, wherein the first and second passages being isolated from one another downstream from the compressor.

11. The system of claim 9, further comprising a valve in the second passage, said valve controlling flow from the compressor into the second passage.

12. The system of claim 9, wherein the secondary combustor is in fluid communication with the primary turbine, compressor and secondary turbine via the second passage; wherein the first passage forms an upstream portion of the second passage.

13. The system of claim 9, further comprising an electric generator driven by the lift fan power turbine, the electric generator electrically coupled to a plurality of electric fans providing roll, yaw and pitch control.

14. A method for localized power extraction from a working fluid, comprising
  compressing a working fluid at a primary compressor;
  dividing out from the compressed working fluid an auxiliary stream downstream of the primary compressor;
  injecting fuel into the compressed working fluid in a primary combustor and heating the working fluid via combustion of the fuel injected into the compressed working fluid;
  expanding the heated working fluid through a primary turbine and driving the primary compressor from work extracted from the expanded working fluid;
  routing the auxiliary stream to an auxiliary combustion chamber remote from a core stream;
  injecting fuel into the auxiliary stream in the auxiliary combustion chamber and heating the auxiliary stream via combustion of the fuel injected into the auxiliary stream; and,
  expanding the heated auxiliary stream through an auxiliary turbine and driving a lift fan from work extracted from the expanded auxiliary stream, wherein an exhaust outlet of the auxiliary turbine is located within a duct containing the lift fan upstream of the lift fan and configured such that an exhaust flow exiting the exhaust outlet acts as an ejector pump to supplement drawing air into an intake of the lift fan.

15. The method of claim 14, further comprising controlling operation of the lift fan by controlling a rate of fuel injected into the auxiliary combustion chamber.

16. The method of claim 14, wherein the auxiliary stream is divided out prior to the working fluid entering the primary combustor or subsequent the working fluid exiting the primary turbine.

* * * * *